US008527765B2

United States Patent
Veugen et al.

(10) Patent No.: US 8,527,765 B2
(45) Date of Patent: Sep. 3, 2013

(54) SHARED SECRET VERIFICATION METHOD AND SYSTEM

(75) Inventors: Peter Joannes Mathias Veugen, Voorburg (NL); Mattijs Oskar van Deventer, Leidschendam (NL); Victor Bastiaan Klos, Den Haag (NL)

(73) Assignee: Nederlandse Organisatie Voor Toegepast-Natuurwetenschappelijk Onderzoek Tno, Delft (NL)

( * ) Notice: Subject to any disclaimer, the term of this patent is extended or adjusted under 35 U.S.C. 154(b) by 74 days.

(21) Appl. No.: 12/992,377

(22) PCT Filed: May 14, 2009

(86) PCT No.: PCT/NL2009/050257
§ 371 (c)(1),
(2), (4) Date: Apr. 1, 2011

(87) PCT Pub. No.: WO2009/139629
PCT Pub. Date: Nov. 19, 2009

(65) Prior Publication Data
US 2011/0179274 A1    Jul. 21, 2011

(30) Foreign Application Priority Data

May 14, 2008   (EP) .................................... 08156173

(51) Int. Cl.
*H04L 9/32* (2006.01)
*H04L 9/08* (2006.01)
(52) U.S. Cl.
USPC ................ 713/169; 380/44; 380/278; 726/27
(58) Field of Classification Search
None
See application file for complete search history.

(56) References Cited

U.S. PATENT DOCUMENTS 5,455,863 A * 10/1995 Brown et al. ................. 380/247
5,768,388 A *  6/1998 Goldwasser et al. ........... 380/30
(Continued)

FOREIGN PATENT DOCUMENTS

WO    WO 2008/045773 A2    4/2008
WO    WO 2008045773 A2 *  4/2008

OTHER PUBLICATIONS

Adams, How to Use One-Time Pads for Secret Communications, Oct. 11, 1998, Spy & Counterspy from http://www.ncmilitia.org/spycounterspy/fs019.html, p. 1-6.*

(Continued)

*Primary Examiner* — Jung Kim
*Assistant Examiner* — James J Wilcox
(74) *Attorney, Agent, or Firm* — Kilpatrick Townsend & Stockton LLP (57) ABSTRACT

Method for shared secret verification in secure data exchange, in which at least two parties, indicated as Alice and Bob, each have a secret and seek to determine whether they share the same secret or not without disclosing the secret itself to each other or any third party. Alice picks a random number RA, encrypts it using Bob's public key, adds the value of her secret, and sends the result K to Bob. Bob receives K, subtracts his secret, and decrypts that using his private key, generating L. Bob performs a one-way function on L and sends the result M to Alice. Alice takes her original RA, performs the same function and verifies whether the result equals the received M. Alice sends her original RA to Bob. Bob receives the RA and verifies whether it equals L, allowing Bob to determine if Alice shares the same secret.

8 Claims, 2 Drawing Sheets

(56) References Cited

U.S. PATENT DOCUMENTS

| | | | |
|---|---|---|---|
| 6,438,691 B1* | 8/2002 | Mao | 713/176 |
| 7,103,184 B2* | 9/2006 | Jian | 380/205 |
| 7,299,356 B2* | 11/2007 | Mizrah | 713/169 |
| 7,373,507 B2* | 5/2008 | Simms | 713/168 |
| 7,471,792 B2* | 12/2008 | Yamamichi et al. | 380/44 |
| 2003/0104859 A1* | 6/2003 | Chaum | 463/22 |
| 2003/0158775 A1* | 8/2003 | Chaum | 705/12 |
| 2005/0235152 A1* | 10/2005 | Ozaki et al. | 713/170 |
| 2008/0082821 A1* | 4/2008 | Pritikin | 713/169 |

OTHER PUBLICATIONS

Yao, Andrew C., Protocols for Secure Computations, 1982, University of California, Berkeley, 5 pages.

Lipmaa, Helger, "Verifiable Homomorphic Oblivious Transfer and Private Equality Test," Laboratory for Theoretical CS, Dept. of CS&E Helsinki University of Technology, 18 pages.

* cited by examiner

SHARED SECRET VERIFICATION METHOD AND SYSTEM

CROSS-REFERENCES TO RELATED APPLICATIONS

This application is a National Stage of International Application No. PCT/NL2009/050257 filed May 14, 2009, and which claims the benefit of European Patent Application No. 08156173.0, filed May 14, 2008, the disclosures of which are incorporated herein by reference.

FIELD OF THE INVENTION

The invention relates to a shared secret verification method, linked to Secure Multi-party Computation (SMC) which method may be used in secure data exchange. The invention also relates to devices, a system and computer program products for executing the method.

BACKGROUND

In systems that use shared secret verification e.g. two parties may each have a secret. They want to find out whether they share the same secret or not but don't want to disclose the secret itself to each other or to a third party. Related to modern telecommunications, the invention refers to secure communication (public and/or private keys), zero-knowledge proofs, one-way (hash) functions, commitment schemes, data compression etc. Applications are among others in the field of secure group formation, e.g. in Internet encountering, in which e.g. two parties meet on the Internet. At a later instance they meet again on the Internet. The problem is how parties can verify that the other is the same party that they met previously, without having to disclose identity information. Another example is the problem which arises when e.g. two mobile devices are tapped against each other to generate a secret time stamp, which is the exact instance of time when the two devices tapped. At a later instance they want to communicate with each other. The problem then is how to verify that the other device has exactly the same time stamp without disclosing the own time stamp.

The problem to which the method according to the present invention aims to provide a solution could be stated as follows: At one point in time, place and communication means, a secret was created. The secret is shared between two or more parties. These parties could be people, machines, or both. At a different point in time, place and/or communication means, two or more parties meet, and want to verify whether the other(s) have the same shared secret. There are no trusted third parties that could be invoked. The secret may have small Shannon entropy. If the protocol/algorithm fails, the fraud has learned no more information than just that. Moreover, the method according the invention should preserve privacy optimally, no identification information should be exchanged either when the secret is created or when it is verified. Also, no third party should be needed either for authentication or verification.

In cryptography, secure multi-party computation (MPC) is a problem that was initially suggested by Andrew C. Yao in 1982 [Andrew Chi-Chih Yao: Protocols for Secure Computations (Extended Abstract) FOCS 1982: 160-164]. In that publication, the millionaire problem was introduced: Alice and Bob are two millionaires who want to find out which is richer without revealing the precise amount of their wealth. Yao proposed a solution allowing Alice and Bob to satisfy their curiosity while respecting the constraints.

Secure MPC provides solutions to various real-life problems such as distributed voting, private bidding and auctions, sharing of signature or decryption functions, private information retrieval, etc. The first large-scale and practical application of multiparty computation took place in Denmark in January 2008 [Peter Bogetoft, Dan Lund Christensen, Ivan Damgård, Martin Geisler, Thomas Jakobsen, Mikkel Krøigaard, Janus Dam Nielsen, Jesper Buus Nielsen, Kurt Nielsen, Jakob Pagter, Michael Schwartzbach and Tomas Toft: Multiparty Computation Goes Live, Cryptology ePrint Archive: Report 2008/068]

The prior art solution to the Millionaire's Problem is illustrated below. Two millionaires, Alice and Bob (usual in cryptography to indicate two parties, A and B) want to know which is richer, without revealing their actual wealth. To begin with, Alice and Bob need a public-key cryptographic system which is strong: in this example RSA. Alice uses RSA, and has a public key which is (79, 3337). Her private key is 1019. To keep the example simple, Alice and Bob have worked out from their Rolls-Royce collections that they are both worth somewhere in the region of 1 to 10 million. They don't want to tell each other how rich they are, but they do want to know which is richer. Alice is worth I millions, and Bob J millions. For this example we will say that Alice is worth 5 million (I=5) and Bob 6 million (J=6). We will just use the numbers 1 to 10, not the millions, although the technique is extendable to the millions.

Step 1

Bob picks a random N-bit integer called x (Alice will later use a N/2 bit prime, so the length of the integer is important—in the worked example the prime we will use is only roughly N/2 bits, but it works). We will let x=1234 (4 decimal digits, N is about 14 bits). Bob first calculates C such that: C=1234^79 mod 3337=901 [C is the RSA encipherment of x.]

Step 2

Bob takes C, and transmits to Alice C−J+1; so 901−6+1=896. He sends 896 to Alice.

Step 3

Alice generates a series of numbers Y1, Y2, Y3 ... Y10 such that Y1 is the RSA decipherment of (C−J+1); Y2 is the RSA decipherment of (C−J+2); Y3 is the decipherment of (C+J+3); ...; Y10 is the RSA decipherment of (C−J+10). She can do this because although she does not know C or J, she does know (C−J+1): it's the number Bob sent her. So we get the following table, where U goes from 1 to 10 and YU is Y1, Y2, Y3, Y4 ... Y10:

| U | (C − J + U) | RSA function | YU |
|---|---|---|---|
| 1 | 896 | 896^1019 mod 3337 | 1059 |
| 2 | 897 | 897^1019 mod 3337 | 1156 |
| 3 | 898 | 898^1019 mod 3337 | 2502 |
| 4 | 899 | . | 2918 |
| 5 | 900 | . | 385 |
| 6 | 901 | . | 1234 (as it should be) |
| 7 | 902 | . | 296 |
| 8 | 903 | . | 1596 |
| 9 | 904 | . | 2804 |
| 10 | 905 | 905^1019 mod 3337 | 1311 |

Step 4

Alice now generates a random N/2 bit length prime p. In this case, we will use 107: this is 7 or 8 bits and so fits the requirement. Alice then generates Z1, Z2, Z3 ... Z10 by calculating Y1 mod p, Y2 mod p, Y3 mod p ... Y10 mod p. So for U=1 to 10, and thus ZU=Z1 to Z10, we can complete the table:

| U | (C − J + U) | RSA function | YU | ZU (=YU mod 107) |
|---|---|---|---|---|
| 1 | 896 | 896^1019 mod 3337 | 1059 | 96 |
| 2 | 897 | 897^1019 mod 3337 | 1156 | 86 |
| 3 | 898 | 898^1019 mod 3337 | 2502 | 41 |
| 4 | 899 | . | 2918 | 29 |
| 5 | 900 | . | 385 | 64 |
| 6 | 901 | . | 1234 | 57 |
| 7 | 902 | . | 296 | 82 |
| 8 | 903 | . | 1596 | 98 |
| 9 | 904 | . | 2804 | 22 |
| 10 | 905 | 905^1019 mod 3337 | 1311 | 27 |

Note that p must be chosen so that all the ZUs differ by at least 2 (this can be non-trivial for smaller examples).

Step 5

This is the clever bit: Alice now transmits the prime p to Bob, and then sends 10 numbers. The first few numbers are Z1, Z2, Z3 ... up to the value of ZI, where I is Alice's wealth in millions (in this case 5). So Alice sends Z1, Z2, Z3, Z4 and Z5. The rest of the numbers she adds 1 to, so she sends Z6+1, Z7+1, Z8+1, Z9+1 and Z10+1. The complete string she sends is:

| p | Z1 | Z2 | Z3 | Z4 | Z5 | Z6+1 | Z7+1 | Z8+1 | Z9+1 | Z10+1 |
|---|---|---|---|---|---|---|---|---|---|---|
| 107 | 96 | 86 | 41 | 29 | 64 | 58 | 83 | 99 | 23 | 28 |

Step 6

Bob now looks at the Jth number where J is his wealth in millions (6), excluding the first prime. He thus looks at 58. He also computes G=x mod p (x being his original random number and p being Alice's random prime which she transmitted to him). Thus:

G=1234 mod 107=57. Now, if the Jth number (58) is equal to G, then Alice is equal or greater to Bob in wealth (I>=J). If the Jth number is not equal to G, then Bob is wealthier than Alice (I<J). In our example, he is, as 57 does not equal 58.

Step 7

Bob tells Alice the result: Alice starts adding 1 to numbers in the series greater than her value (5): Bob is checking to see if the one in his position in the series (6) has had one added to it: if it has, then he knows he must be wealthier than Alice.

This has all been done without either of them transmitting their wealth value; at the end they both know more: Alice knows Bob has 6 to 10 million, and Bob knows Alice has 1 to 5 million, but that is an inevitable conclusion of knowing which one is wealthier. If the >= condition holds, they can run the protocol the other way round to see if Alice is actually richer, or if they both have the same wealth.

This technique is not cheat-proof (Bob could lie in step 7). Yao shows that such techniques can be constructed so that cheating can be limited, usually by employing extra steps.

Lastly, in the real world, one could use this technique: but it will take some processing power. If one wanted to cover the range 1 to 100,000,000, at a unit resolution, then Alice will be sending Bob a table of 100,000,000 numbers, which probably will be at least 8-byte integers. With realistic formatting overheads, this means that this table is on the order of a gigabyte. It's handleable, but the processing and storage implications of this technique in the real world is non-trivial which is a serious problem for practical implementations.

SUMMARY

The present invention aims to give a solution for this problem.

An object of the invention is to provide a more lean and efficient protocol which is well-fit for practical implementations in modern secure data exchange applications.

A method according to claim 1 is provided. Where the known protocol of Yao is able to decide whether x<y, which requires that Alice has to encrypt all possible values of x and y, after which Bob is able to decide which of x and y is larger, the claimed method only determines whether x=y, due to which Alice only needs to encrypt the values of x, after which Bob only needs to decide whether y=x (or not). This approach results in a more efficient protocol. In an embodiment, an extra step, added to the protocol, may provide that Alice and Bob will be able to decide whether both values x and y are or are not equal without being forced to perform the protocol all over again.

According to one aspect respective devices are provided that are configured to perform the actions of the respective parties of this method. These may be consumer devices. In a further embodiment a device may combine the features of both respective devices, so that it can act as Alice or Bob as required.

BRIEF DESCRIPTION OF THE DRAWING

These and other objects and advantageous aspects will become apparent from a description of exemplary embodiments. A new protocol will presented. The description of the exemplary embodiments refers to the following figures.

DETAILED DESCRIPTION OF EXEMPLARY EMBODIMENTS

Figure 1:
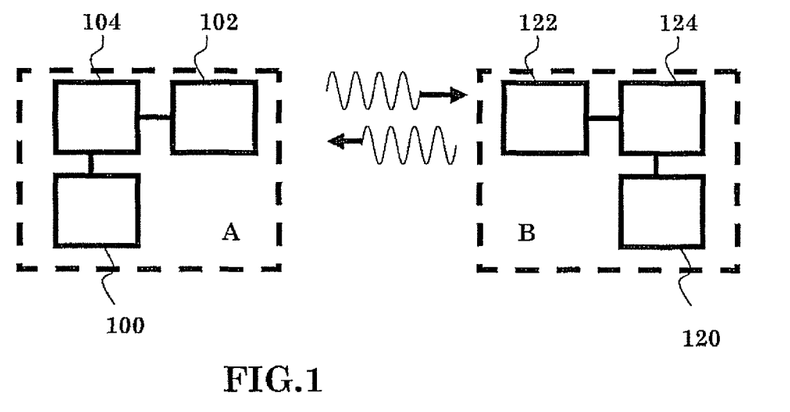
FIG. 1 shows a communication system

FIG. 1 shows a communication system comprising a first device A and a second device B. Both devices A, B comprise a memory 100, 120, a transceiver 102, 122 and a processor 104, 124. In each device the processor 104, 124 is coupled to the memory 100, 120 and the transceiver 102, 122 of the device. The devices A, B need not be identical: one device may be a smart card chip and the other may be a machine for communicating with such a smart card chip. Alternatively, the devices A, B may be mobile phones for example. Transceivers 102, 104 are devices that provide for the exchange of messages between the devices A. B. Any message exchange medium may be used: conductors may be used or a wireless communication medium may be used for example. The transceiver 102, 120 may comprise a wireless communication receiver and transmitter or a smart card reader or reader interface for example.

Memories 100, 120 both store secret information that is the same in both devices A, B. This information is called a shared secret. In operation processors 104, 124 cause the devices A, B to exchange information to verify that the secret information is the same, without revealing the secret information in the signals exchanged between the devices. In the customary terminology of cryptography, the devices A, B will be called Alice and Bob respectively and they will also be referred to as "parties".

As mentioned, the invention enables two parties to mutually verify whether they share the same secret. The invention uses the following ingredients.

Figure 2:
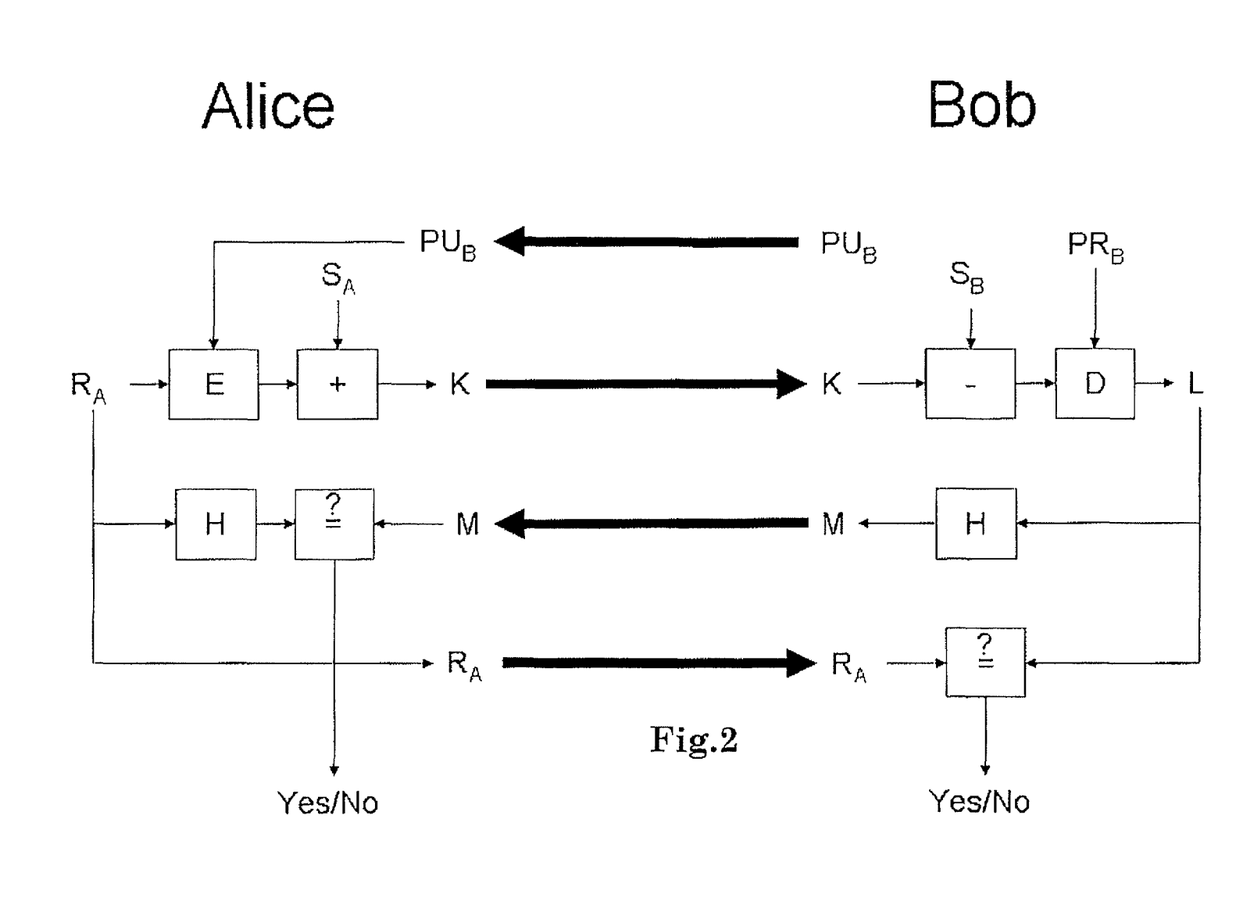
FIG. 2 illustrates operations involved in verification of a shared secret

Shared secret S
Encryption algorithms E
Decryption algorithms D
One-way (hash) function H
Public key PU
Private key PR
Random number R FIG. 2 illustrates an algorithm to implement the protocol (Yes/No is the answer to the question "is SA equal to SB?"). In the algorithm of FIG. 2 the following steps are performed:

Step 1

Bob sends his public key PUB to Alice. Note: Alice may already have (access to) Bob's public key. In this case the public key need not be sent.

Step 2

Alice picks a random number RA, encrypts it using Bob's public key PUB, adds the value of her secret SA, and sends the result K to Bob. Note: Alice can not use only a one-way function here, because then Bob could simply try all secrets in the limited secret space (low Shannon entropy) until he finds the one that yields the same one-way function output.

Step 3

Bob receives K, subtracts his secret SB, and performs a decryption using his own private key PRB. Note: If Alice and Bob have the same secret, that is SA=SB, then the result L will be equal to Alice's original random number RA. If the secrets were not the same, that is SA≠SB, then also RA≠L.

Step 4

Bob takes L, performs the one-way function H on it, and sends the result M back to Alice. Note: The reason for using a one-way function is that many encryption/decryption algorithms are commutative. That means that one can also do decryption before encryption. This would be a problem, because Alice could calculate Bob's secret by as SB=K·DPRA(L). So Bob has to keep his result L secret, and can only send the one-way function of L.

Step 5

Alice receives M, takes her original random number RA, performs the same one-way function H and verifies whether the result equals the received M. Note: If the answer is "yes", then Alice knows that Bob has the same secret. If the answer is "no" then she knows he doesn't.

Step 6

Alice sends her original random number RA to Bob. Notice that Alice should only perform step 6 if the result of step 5 was "yes". If the answer was "no", then she could send any random number RA', or just the message that the protocol has failed.

Step 7

Bob receives RA and verifies whether it is equal to his earlier result L. If the answer is "yes", then Alice knows that Bob has the same secret. If the answer is "no" then he knows she doesn't.

When the devices A and B perform these steps, the processor 104 of first device A may perform the picking of the random number RA, the encryption using public key PUB, the addition of the value of the secret SA from the memory 100 of the first device A and the processor 104 cause the transceiver 102 of the first device A to transmit the result of the addition of the secret SA to the result of encrypting the random number with the public key PUB.

Furthermore, the processor device A may apply the one-way function H to the random number RA and a verification whether the result of applying H to RA equals the received M.

The processor 124 of second device B may be configured to cause the transceiver 122 of second device B to obtain the transmitted result K, and to subtract the secret SB from the memory 120 of the second device B, perform a decryption using the private key PRB of device B, to apply the one-way function H to the result of decryption, and to cause the transceiver 122 of the second device B to transmit the result M back to the first device.

If the secrets SA, SB stored in the memories 100, 120 are equal (SA=SB), then the result L will be equal to the random number RA. If the secrets were not the same, that is SA≠SB, then also RA≠L. Optionally the processor 124 of the second device B may be configured to receive the random number RA from the first device A to verify whether the random number equals to his earlier result L. Processors 104, 124 may be programmable processor circuits, provided with a program to perform the various operations.

Several variations and enhancements are possible on the proposed algorithm

Variation 1

The algorithm could be extended to determining who should start the exchange, Alice or Bob. An approach is that the initiator of the communication has to go first (or second). For example, if device A first sends a message to device B to initiate the communication, device A make take the role of Alice. In this case, the initial message may be encrypted random number to which the secret SA has been added. Alternatively, reception of a initial message from device B may trigger device A to start executing the steps of the protocol.

Another approach is determined by taking a random decision (flipping a coin), using a commitment scheme, allowing the relevant party to commit to the relevant value while keeping it hidden, and while preserving the parties' ability to reveal the committed value later to ensure the fairness of the random decision (flip of the coin). A random decision may be taken for example by selection a binary value on a random basis.

Variation 2

Instead of doing steps 6 and 7, Alice and Bob could repeat steps 1 to 5 where it is Bob who starts the exchange. In this case Bob may perform the steps of Alice and Alice may perform the steps of Bob.

Variation 2a

In an embodiment wherein steps 6 and 7 are skipped, an encryption algorithm E and a decryption algorithm D may be used that are not commutative. In this embodiment the one-way function H may be omitted. As noted in the context of step 4, the reason for using a one-way function is to prevent Alice from calculating Bob's secret from the result L send by Bob. When not commutative encryption and decryption are used Alice cannot compute DPRA(L) and the one way (Hash) function H may be omitted.

Variation 3

If Bob already happens to know Alice's public key, then Alice does not have to send it.

Variation 4

As used herein, "add(ing)" and "subtract(ing)" refer to any pair of mathematical functions for combining numbers that are equivalent to the pair of adding and subtraction in that they are the reverse of each other and in that they operate to combine two numbers as in a numerical addition, i.e. that they operate to combine two numbers in a way that makes it necessary to have one of the numbers (the secret) to reconstruct the other number from the result by means of a simple reverse operation.

Numerical integer addition/subtraction or a bit-wise addition/subtraction (bit-wise exclusive OR) may be used for example. Instead of using numerical integer or bit-wise addition in step 2 and subtraction in step 3, any reversible mathematical function of may be used, e.g. numerical mathematical functions like multiplication/division, power/logarithm, or combinations of such functions. These mathematical functions will generically be referred to as adding and subtracting. The step 2 may involve computing the product EB(RA)*SA, the difference EB(RA)−SA or the power $EB(RA)^{SA}$ for example, instead of the sum SA+EB(RA) of the secret SA and the result EB(RA) of encrypting the random number with the public key of Bob. In this case step 3 may involve computing the ratio K/SB the sum K+SB, the logarithm $^{SB}\log K$ instead of the subtraction K−SB. The roles of addition/subtraction may be interchanged, the secret SA being subtracted from the encrypted random number and added to the received result K. Similarly the roles of multiplication/division and power/logarithm may be interchanged

Variation 5

Instead of using fixed encryption and decryption algorithms, Bob could also use the protocol to signal which encryption algorithm Alice should use, or vice versa.

Variation 6

Instead of using fixed one-way function, Bob could also use the protocol to signal which one-way function Alice should use, or vice verse.

Variation 7

Some messages could be in different orders, e.g. Alice could send her public key PUA after she sends result K, or send both inside the same message. The same is the case for the selected encryption/decryption algorithm and/or one-way function of variations 5 and 6.

Variation 8

In some cases, it may be needed to encode the secret. In this case all parties get a consecutive number or any data compression algorithm could be used on the secret.

Variation 9

By sending RA in step 6, an adversary that eavesdrops on the communication between Alice and Bob will be able to compute the secret. To avoid such risks, Alice should concatenate RA with the secret, compute its image under a one-way function, and send the result to Bob, instead of the number RA itself. In this way, eavesdropping adversaries will not learn the secret.

Variation 10

All steps could be further secured by using a secure communication channel, e.g. by encrypting all messages with the public key of the receiver.

Variation 11

All steps could be further secured by using an authentication mechanism, e.g. by using public-key based authentication. Furthermore, each message could be provided with a digital signature, e.g. by encrypting the message with the private key of the sender. The addition of authentication to the protocol ensures that a man-in-the-middle can no longer frustrate the protocol.

Use of the protocol solves a problem associated with patent applications WO2009/014438. Moreover, the protocol suggests a new role for trusted third party companies, namely the verification of shared secrets. In this case the trusted third party will execute the steps of one of Alice and Bob.

A method is provided for shared secret verification e.g. to be applied in secure data exchange, in which at least two parties, hereinafter indicated as Alice and Bob, each have a secret while their challenge is to find out whether they share the same secret or not, however, without disclosing the secret itself to each other or to any third party, the method comprising next steps, including a secret SA and SB respectively, encryption algorithms E, decryption algorithms D, a one-way or hash function H, public keys PUA and PUB, private keys PRA and PRB and a random number RA:

Step 1: Alice picks a random number RA, encrypts it using Bob's public key PUB, adds the value of her secret SA, and sends the result K to Bob;

Step 2: Bob receives K, subtracts his secret SB, and performs a decryption using his own private key PRB;

Step 3: Bob performs the one-way function H on L and sends the result M to Alice;

Step 4: Alice receives M, takes her original random number RA, performs the same one-way function H and verifies whether the result equals the received M.

Instead of using addition in step 1 and subtraction in step 2, any reversible mathematical function of may be used, e.g. multiplication/division, power/logarithm, or combinations of such functions.

In an embodiment these steps are followed by:

Step 5: Alice sends her original random number RA to Bob;

Step 6: Bob receives RA and verifies whether it equals to his earlier result L and concluding that, if the answer is "no", Alice knows that Bob has the same secret and that, if the answer is "yes" Bob knows Alice doesn't have the same secret.

In an embodiment Alice and Bob repeat steps 1 to 4, where it is Bob who starts the exchange.

In an embodiment Alice a step is included to determine which party should start the exchange, Alice or Bob. The determination of which party should start the exchange may be determined by which party initiates of the exchange communication or it may be determined by "flipping a coin" and using a commitment scheme to ensure the fairness of the flip.

The invention claimed is:

1. A computer implemented method of determining whether a first secret and a second secret, stored in a memory of a first device and the memory of a second device, respectively, are the same or not, without disclosing the secret stored in the first device to the second device or to any third party, the method comprising following steps, wherein:

which of the first device and second device should start the exchange is determined by means of a random decision and wherein a commitment scheme is used to ensure fairness of the random decision;

the first device picks a random number RA, encrypts the random number RA using a public key PUB of the second device, adds the value of a secret SA of the first device, and sends a first result K of these steps to the second device;

the second device receives the first result K, subtracts a secret SB of the second device, and performs a decryption of a result of the subtraction, using a private key PRB of the second device, the decryption resulting in a decrypted result L;

the second device applies a one-way function H on the decrypted result L and sends a second result M of the application of the one-way function to the first device;

the first device applies said one-way function H to the random number RA;

the first device receives the second result M and verifies whether the received second result M equals a result of applying said one-way function H to the random number RA; and wherein the first device and second device each comprise a processor, a non-transitory computer readable medium, and a transceiver.

2. A method according to claim 1, wherein the first device and the second device repeat the steps, with the roles of the first and second devices mutually interchanged.

3. A method according to claim 1, followed by the steps of:

the first device sending the random number RA to the second device;

the second device receiving the random number RA and verifying whether the random number RA is equal to the earlier decrypted result L and concluding that, if the random number RA does equal the decrypted result L, the first device knows that the second secret is the same as the first secret and that, if the random number RA does not equal the decrypted result L, the second device knows that the first secret is not the same as the second secret.

4. A device comprising a memory storing a secret SA; and a processor configured to determine whether a further device possesses said secret SA by picking a random number RA, encrypting the random number RA using a public key PUB of the further device, adding the value of a secret SA, sending a first result K of these steps to the further device, receiving a second result M back from the further device, applying a one-way function H to the random number RA and verifying whether the received second result M equals a result of applying said one-way function H to the random number RA, wherein which of the device and the further device should start the exchange is determined by means of a random decision and wherein a commitment scheme is used to ensure fairness of the random decision.

5. A device comprising a memory storing a secret SB; and a processor configured to determine whether a further device possesses said secret SB by receiving a first result K from a further device, subtracting the secret SB, performing a decryption of a result of the subtraction, using a private key PRB of the device, the decryption resulting in a decrypted result L, applying a one-way function H on the decrypted result L and sending a second result M of the application of the one way function back to the further device, wherein which of the device and the further device should start the exchange is determined by means of a random decision and wherein a commitment scheme is used to ensure fairness of the random decision.

6. A system comprising a device according to claim 4, the system further comprising the further device, the further device comprising a further memory storing a secret SB; and a further processor configured to determine whether a further device possesses said secret SB, by receiving a first result K, subtracting the secret SB, performing a decryption of a result of the subtracting, using a private key PRB of the device, the decryption resulting in a decrypted result L, applying a one-way function H on the decrypted result L and sending a second result M of the application of the one way function back to the device that transmitted the first result.

7. A computer program product stored on a non-transitory computer readable medium, comprising a program of instructions that, when executed by a programmable processor, cause the processor to:

pick a random number RA;

encrypt the random number RA using a public key PUB of a device;

add the value of a secret SA to the encrypted random number;

send a first result K of these steps to the device;

receive a second result M back from the device;

apply a one-way function H to the random number RA; and verify whether the received second result M equals a result of applying said one-way function H to the random number RA, wherein whether the processor should start execution of the computer program is determined by means of a random decision and wherein a commitment scheme is used to ensure fairness of the random decision.

8. A computer program product stored on a non-transitory computer readable medium, comprising a program of instructions that, when executed by a programmable processor, cause the processor to:

receive a first result K from a device;

subtract a secret SB from the first result;

perform a decryption of a result of the subtraction, using a private key PRB, the decryption resulting in a decrypted result L;
apply a one-way function H on the decrypted result L
send a second result M of the application of the one way function back to the device,
wherein whether the processor should execute the computer program to receive the first result K from a device is determined by means of a random decision and wherein a commitment scheme is used to ensure fairness of the random decision.

* * * * *

UNITED STATES PATENT AND TRADEMARK OFFICE
CERTIFICATE OF CORRECTION

PATENT NO. : 8,527,765 B2  Page 1 of 1
APPLICATION NO. : 12/992377
DATED : September 3, 2013
INVENTOR(S) : Veugen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 212 days.

Signed and Sealed this

Fifteenth Day of September, 2015

Michelle K. Lee
*Director of the United States Patent and Trademark Office*